3,285,742
LITHOGRAPHIC PRINTING PLATE AND PROCESS OF MAKING

Richard L. Wagner, Wilmington, Del., assignor to Hercules Incorporated, a corporation of Delaware
No Drawing. Filed Oct. 4, 1963, Ser. No. 313,748
11 Claims. (Cl. 96—33)

This invention relates to the preparation of a lithographic printing plate and more particularly to a grained polyolefin printing plate, i.e., an oleophilic surface, with an adherent cross-linked ethylene oxide polymer coating having hydrophilic properties.

Photo-reproduced lithographic plates are commonly made by coating a hydrophilic substrate, such as aluminum or zinc, with a thin layer of a water-soluble (water-receptive) polymeric material which contains a photosensitive agent. When exposed to light through an image-bearing transparency, the areas of the coating that are struck by light are cross-linked to the point where they are no longer water-receptive but become ink-receptive (oleophilic). The nonirradiated areas of the coating are then removed by washing to re-expose the hydrophilic substrate material below. A negative transparency of the desired image areas is required to produce such a plate. In such a transparency, the light will pass through the transparent image areas but will not pass through tht opaque nonimage areas. The resulting plate prints a positive image.

A need exists in the lithographic industry for a photo-reproduced printing plate that can be cheaply and easily made using a positive transparency (i.e., a positive working plate). Attempts have been made to produce such a printing plate by reversing the above procedure, i.e., applying a water-soluble or water-receptive coating to an oleophilic substrate and cross-linking it to the point where it is insoluble but still retains its hydrophilic properties. However, it has not previously been possible to produce, by such a simple operation, an oleophilic substrate with a hydrophilic film whose abrasion resistance and mechanical strength is satisfactory for printing plate use. Previously such coatings would lift off and wear away from the substrate either during image development or after a limited number of copies have been made on the press.

Now in accordance with this invention it has been discovered that a positive working lithographic printing plate can be made by coating a polyolefin substrate with a mixture of an ethylene oxide polymer and an aromatic polyazide, exposing the coated plate to light through a positive transparency whereby the ethylene oxide polymer is cross-linked in the areas struck by light, and then removing the uncross-linked ethylene oxide polymer from the polyolefin substrate by washing. The lithographic printing plate so obtained prints a positive because the cross-linked ethylene oxide polymer areas retain the hydrophilic properties of the ethylene oxide polymer and the polyolefin substrate areas are oleophilic and hence are the printing areas. Following the same procedure, but using a negative transparency, a negative working plate can be produced for use in a reverse lithographic process, i.e., for use with water-based inks.

It was entirely unexpected that poly(ethylene oxide) could be made to adhere to a substrate by cross-linking and still retain the hydrophilic properties of the poly(ethylene oxide). Previously to obtain sufficient adhesion of photo-sensitive coatings to a substrate, it was necessary to cross-link them to such a high degree that they lost their hydrophilic properties and became oleophilic. In the process of the present invention it is necessary to cross-link the poly(ethylene oxide) only lightly, and it retains its hydrophilic properties. The reason for this effect is believed to be due to a cross-linking reaction taking place between molecules of the polyolefin substrate and the poly(ethylene oxide) coating as well as between molecules of the latter. As a result the poly(ethylene oxide) coating is chemically bound to the polyolefin substrate.

Any ethylene oxide polymer can be used in the preparation of the printing plates in accordance with this invention. Thus a homopolymer of ethylene oxide or a copolymer of ethylene oxide with another alkylene oxide as, for example, propylene oxide, butene-1 oxide, cis- or trans-butene-2 oxide, etc., methyl glycidyl ether, etc., wherein the copolymer contains at least about 40% ethylene oxide can be used. The molecular weight of the polymer that is used is not critical, the only criterion being that it becomes insolubilized on cross-linking. Generally the polymer will have a molecular weight of about 5,000 and preferably from about 100,000 to about 1,000,000. Higher molecular weight polymers can be used up to 10,000,000 or more, but may necessitate application to the polyolefin substrate from the melt rather than from a solution. Any desired thickness of the ethylene oxide polymer can be used. However, since the coating thickness influences the irradiation time required for insolubilization and anchoring of the coating to the substrate, the thinnest possible coating should be used that will give the desired hydrophilic effect and at the same time be thick enough to provide a long plate life. Hence, a thickness of from a monomolecular layer up to 3 mils or more can be used, but for most practical considerations a coating of from about 0.01 mil to about 1 mil is generally preferred.

Any polyolefin, as for example stereoregular polypropylene and high or low density polyethylene, can be used as the substrate for the preparation of positive working lithographic printing plates of this invention. Stereoregular polypropylene, i.e., crystalline polypropylene which is sometimes called isotactic polypropylene, is of outstanding value since the irradiation time required to achieve good adhesion of the poly(ethylene oxide) coating is shorter than in the case of polyethylene. The substrate may be of any desired thickness, but, of course, for use on a lithographic press must be sufficiently flexible to enable it to be wrapped around the cylinder of the press. Hence it is sometimes desirable to incorporate inorganic fillers in the substrate polyolefin since they increase the modulus allowing a thinner substrate sheet to be used. Obviously, laminates with a surface of the polyolefin can be used, as for example, paper, metal, etc., coated with the polyolefin, or a laminate of any plastic coated with the polyolefin.

Any aromatic polyazide having the general formula $R(N_3)_x$ where R is an aromatic grouping inert to the cross-linking reaction, and $x$ is an integer greater than 1, can be used as the photosensitive cross-linking agent. Preferably $x$ will be an integer from 2 to 200 and R will be selected from the group of organic radicals consisting of arylene and alkarylene radicals. Exemplary of the aromatic polyazides useful in this invention are m-phenylene diazide, 2,4,6-triazidobenzene, 4,4′-diphenyl diazide, 4,4′-diphenylmethane diazide, 4,4′-diazido diphenylamine, 4,4′-diazido diphenylsulfone, 2,7-diazidonaphthalene and 2,6-diazidoanthraquinone. Thus, any compound having at least two azide groups in the molecule can be used as the azide cross-linking agent in this invention.

The amount of the azide cross-linking agent used in the preparation of the adherent coatings of this invention can be varied over a wide range. Generally, it will be an amount of from about 0.1% of the weight of the ethylene oxide polymer up to as high as 20%, but usually will be from about 0.5 to about 10% of the weight of the ethylene oxide polymer.

The amount of exposure and the wave length of the light used in cross-linking the ethylene oxide polymer will depend upon the ethylene oxide polymer used, thickness of the coating, the polyazide used, etc. Generally exposure to a wave length of from 0.01 A. to 7600 A. is effective and preferably a wave length of from about 2000 A. to about 4000 A. will be used. If desired, sensitizers for the aromatic polyazides can be used to shift the spectral response into other regions and to accelerate the cross-linking reaction. The irradiation time can be varied from 10 seconds or less up to 60 minutes or more but will, of course, depend on the intensity of the light source, distance, etc.

Any means can be used for applying the mixture of ethylene oxide polymer and aromatic polyazide to the surface of the polyolefin substrate. The film of polyolefin can be dipped in a solution, dispersion or emulsion of these two agents in any convenient solvent and of a concentration suitable to give the desired amount of add-on. Such solutions, dispersions or emulsions can also be painted, sprayed, applied by a roll, doctor blade, etc., onto the substrate. Diluents suitable for applying the mixture of ethylene oxide polymer and aryl polyazide are water, any inert organic diluent as, for example, aromatic hydrocarbons such as benzene, toluene, etc., halogenated hydrocarbons such as carbon tetrachloride, ethylene dichloride, etc., acetone, dioxane, ethyl acetate, methyl isobutyl ketone, etc. Obviously, the diluent will be one which is not a solvent for the polyolefin so as not to destroy its surface.

In preparing the lithographic printing plates in accordance with this invention, outstanding results are obtained by using a polyolefin substrate with a grained surface. Such grained polyolefin substrates can be prepared by replicating the graining of a lithographic grained master plate onto the surface of the polyolefin substrate. This can be done by heating the polyolefin under pressure and in contact with the grained surface of the master plate. A simple method of preparing the grained polyolefin substrate is by compression molding a plate of the polyolefin using the grained metal master plate as one face of the mold. Another method is to inject molten polyolefin under pressure into a closed mold, one surface of which is the grained metal master plate. Any lithographic grained metal plate can be used as the master plate such as are prepared by the tub graining method well known in the printing industry. The graining of the substrate improves not only the ink transfer and print quality in using the plate, but also shortens the irradiation time required to anchor the coating to the polyolefin surface.

As described above, a positive working plate is produced by exposing the poly(ethylene oxide) coated polyolefin to light through a positive transparency. When then used in a normal printing process with oil-based inks, the polyolefin surface is the ink-receptive printing surface. However, the process of this invention is equally useful in the preparation of a negative working plate to be used with water-based inks. In this case the poly(ethylene oxide) coated polyolefin is exposed to light through a negative transparency and because the image areas are now the hydrophilic areas, a positive print is obtained with the water-based inks.

The following examples will illustrate the process of this invention and the outstanding printing plates so obtained. All parts and percentages are by weight unless otherwise indicated.

*Example 1*

A sheet, 0.025 inch thick, made of stereoregular polypropylene having a reduced specific viscosity of 3.5 as determined on a 0.1% solution in decahydronaphthalene at 135° C., was grained on one side with a lithographic finish by compression molding using a grained lithographic plate as the master. A 1% solution of a commercial poly(ethylene oxide), having a molecular weight of about 600,000, in ethylene dichloride and containing 10% based on the poly(ethylene oxide) of 4,4'-diphenyl methane diazide was prepared. The grained polypropylene sheet was then dip-coated with a thin layer of this solution and allowed to air dry in the dark.

The grained coated surface was covered with a positive transparency comprised of lines and halftone images and exposed to a 100-watt high-pressure mercury arc. Areas were exposed for 15 minutes at a lamp distance of 3 inches. After exposure a brown discoloration defined the exposed poly(ethylene oxide) regions.

The plate was developed by scrubbing the surface with warm tap water. Within a short time the nonirradiated poly(ethylene oxide) areas were washed away. The cross-linked poly(ethylene oxide) areas were left behind and could not be removed even by a vigorous scrubbing action.

The plate was run on an offset press. The poly(ethylene oxide) areas, being still hydrophilic, accepted the water and repelled the ink. The oleophilic polypropylene areas on the other hand accepted and transferred the lithographic ink film satisfactorily.

*Example 2*

A laminate having a polypropylene surface grained with a No. 6–0 lithographic finish, was dip-coated in a poly(ethylene oxide) solution as described in Example 1, but containing only 5% by weight of the poly(ethylene oxide) of the 4,4'-diphenyl methane diazide. After irradiation for 8 minutes through a positive transparency, using the light source described in Example 1 at a distance of 52 mm., the poly(ethylene oxide) had insolubilized and was firmly adhered to the polypropylene surface. After development under a warm water tap, the plate was placed on a Multilith 1250 printing press. The poly(ethylene oxide) nonimage areas preferentially accepted the aqueous fountain solution and repelled the ink, while the polypropylene areas accepted and transferred the lithographic ink nicely.

*Example 3*

A smooth sheet of compression molded stereoregular polypropylene (reduced specific viscosity of 3.3) was dip-coated with a 1% solution of poly(ethylene oxide) in ethylene dichloride and containing 10% by weight of the poly(ethylene oxide) of 4,4'-diphenyl methane diazide and then was air dried. The poly(ethylene oxide) used was a commercial, water-soluble homopolymer having a molecular weight of about 600,000. After exposure to ultraviolet light through a positive transparency at a distance of 13 inches for 10 minutes, the cross-linked poly(ethylene oxide) coating in the nonimage areas was not removed when scrubbed with warm water whereas the poly(ethylene oxide) coating in the image areas which had not been irradiated were completely removed on scrubbing. The plate so produced gave an excellent printing.

*Example 4*

A grained sheet of high-density polyethylene having a molecular weight of about 150,000 was prepared as described in Example 1. It was dip-coated in a 1% ethylene dichloride solution of poly(ethylene oxide) which also contained 5% by weight of the poly(ethylene oxide) of 4,4'-diphenyl methane diazide. The surface was exposed through a positive transparency to ultraviolet light using a 100-watt lamp as described in Example 1 for 30 minutes at 5 inches. The nonexposed areas were removed by flushing the surface with warm tap water. The irradiated poly(ethylene oxide) areas remained firmly adhered to the polyethylene substrate and functioned as nonimage areas when placed on an offset press. The polyethylene areas were ink-receptive and printed nicely.

*Example 5*

A sheet of 80 lb. bleached kraft paper coated with a 1 mil thick coating of a commercial polypropylene was placed in a press and covered with a metal lithographic master plate having a No. 6–0 lithographic finish and the assembly was pressed at 172° C. for 5 minutes under 500 p.s.i. pressure. It was then cooled to room temperature with a water quench while still under pressure.

A section of the grained polypropylene-paper laminate was then coated with a 1% solution in ethylene dichloride of a commercial poly(ethylene oxide) having a molecular weight of about 600,000, said solution also containing 10% by weight of the poly(ethylene oxide) of 4,4′-diphenyl methane diazide and the coating was air dried.

The grained polypropylene coated surface was then irradiated with ultraviolet light for 15 minutes at a distance of 5 inches through a positive transparency. On scrubbing the surface with warm tap water, the nonirradiated poly(ethylene oxide) areas were washed away. The poly(ethylene oxide) areas remaining on the plate were tightly adhered and were the non-printing areas when placed on a lithographic press.

*Example 6*

This example demonstrates the use of the process of this invention in the preparation of a reverse lithographic printing plate, i.e., a plate for use with water-based inks and a hydrocarbon solvent as the fountain solution in the lithographic press.

A lithographic printing plate was prepared as described in Example 1 except that the poly(ethylene oxide) coated polypropylene was exposed to light through a negative transparency instead of a positive transparency. The negative working plate so produced had durable image areas, which in this case were the tightly adherent poly(ethylene oxide) areas that were receptive to the water-based ink and the nonimage areas were the oleophilic polypropylene which were receptive to the hydrocarbon solvent in the fountain solution of the printing press.

What I claim and desire to protect by Letters Patent is:

1. The process of preparing a lithographic printing plate comprising the steps of (1) coating a polyolefin substrate with a mixture of a polymer of ethylene oxide having a molecular weight of from about 5,000 to about 10,000,000 and an aromatic polyazide, (2) exposing the coated plate to light through a transparency until the exposed regions of the polymer of ethylene oxide coating become insoluble, and (3) removing from the unexposed regions the soluble polymer of ethylene oxide.

2. The process of claim 1 wherein the surface of the polyolefin substrate has been grained prior to the coating step.

3. The process of claim 2 wherein the polymer of ethylene oxide is a homopolymer of ethylene oxide having a molecular weight of from about 100,000 to about 1,000,000.

4. The process of claim 3 wherein the polyolefin substrate is stereoregular polypropylene.

5. The process of claim 3 wherein the polyolefin substrate is polyethylene.

6. The process of claim 3 wherein the polyolefin substrate is a laminate of paper coated with polypropylene.

7. The process of claim 4 wherein the coated plate is exposed to light through a positive transparency.

8. The process of claim 4 wherein the coated plate is exposed to light through a negative transparency.

9. A printing plate in which the oleophilic regions comprise a grained polyolefin surface and the hydrophilic regions comprise an insolubilized polymer of ethylene oxide.

10. A printing plate in which the oleophilic regions comprise a grained polypropylene surface and the hydrophilic regions comprise an insolubilized homopolymer of ethylene oxide having a molecular weight of from about 100,000 to about 1,000,000.

11. A printing plate in which the oleophilic regions comprise a grained polyethylene surface and the hydrophilic regions comprise an insolubilized homopolymer of ethylene oxide having a molecular weight of from about 100,000 to about 1,000,000.

No references cited.

NORMAN G. TORCHIN, *Primary Examiner.*

C. BOWERS, *Assistant Examiner.*